United States Patent Office.

JULES FOUGERAT, OF NEW YORK, N. Y.

Letters Patent No. 78,078, dated May 19, 1868.

---

IMPROVEMENT IN THE MANUFACTURE OF IODINE.

---

The Schedule referred to in these Letters Patent and making part of the same.

---

TO ALL WHOM IT MAY CONCERN:

Be it known that I, JULES FOUGERAT, of the city, county, and State of New York, have invented a new and improved Process for Producing Iodine from Mussels; and I do hereby declare that the following is a full, clear, and exact description thereof, which will enable others skilled in the art to understand the same.

This invention relates to a new manner of extracting iodine from mussels, or their shells, and it consists in the following process, by which the crystallized iodine is produced:

The mussels, whether simply shells or when alive, are first calcinized, and are then pulverized. They are then placed into water, about one part of the mussels to five parts of water, and are then boiled until the water stands about 36° in the alkalimeter.

Sulphuric acid and protoxide of iron are then added to the mixture, in sufficient quantities to dissolve the crystals of the iodine, which are then precipitated by means of a current of chlorine gas, or by sulphide of carbon, and the iodine settles, then, on the bottom of the vessel, in form of crystals:

The protoxide of iron may be omitted, if desired.

As the iodine on the bottom of the vessel may not be quite pure, it should be redistilled in a retort, to have the pure iodine evaporated, and then condensed in a suitable receptacle.

Having thus described my invention, what I claim as new, and desire to secure by Letters Patent, is—

1. Producing iodine from mussels, as set forth.
2. The process herein shown and described of producing iodine from mussels.

The above specification of my invention signed by me, this 16th day of January, 1868.

J. FOUGERAT.

Witnesses:
WM. F. MCNAMARA,
ALEX. F. ROBERTS.